US009864080B2

(12) United States Patent
Tenghamn et al.

(10) Patent No.: US 9,864,080 B2
(45) Date of Patent: Jan. 9, 2018

(54) GAS SPRING COMPENSATION MARINE ACOUSTIC VIBRATOR

(71) Applicant: PGS Geophysical AS, Oslo (NO)

(72) Inventors: Stig Rune Lennart Tenghamn, Katy, TX (US); Jonathan David Snodgrass, Des Moines, IA (US); Bo Carl Fredrik Löfgren, Järfälla (SE); Karl-Henrik Ryttersson, Västerås (SE)

(73) Assignee: PGS Geophysical AS, Oslo (NO)

( * ) Notice: Subject to any disclaimer, the term of this patent is extended or adjusted under 35 U.S.C. 154(b) by 799 days.

(21) Appl. No.: 14/145,214

(22) Filed: Dec. 31, 2013

(65) Prior Publication Data

US 2014/0340985 A1 Nov. 20, 2014

Related U.S. Application Data

(60) Provisional application No. 61/823,892, filed on May 15, 2013.

(51) Int. Cl.
| | |
|---|---|
| *G01V 1/04* | (2006.01) |
| *G01V 1/135* | (2006.01) |
| *G01V 1/145* | (2006.01) |
| *G01V 1/38* | (2006.01) |
| *G10K 9/12* | (2006.01) |

(52) U.S. Cl.
CPC ............. *G01V 1/135* (2013.01); *G01V 1/145* (2013.01); *G01V 1/38* (2013.01); *G10K 9/121* (2013.01)

(58) Field of Classification Search
None
See application file for complete search history.

(56) References Cited

U.S. PATENT DOCUMENTS

| | | | |
|---|---|---|---|
| 3,384,868 A | 5/1968 | Brown | |
| 3,964,014 A * | 6/1976 | Tehon | B06B 1/0629 310/322 |
| 3,978,940 A | 9/1976 | Bouyoucos | |
| 4,175,311 A | 11/1979 | Bunyan | |
| 4,185,714 A | 1/1980 | Pascouet et al. | |
| 4,211,301 A | 7/1980 | Mifsud | |
| 4,231,112 A | 10/1980 | Massa | |
| 4,483,411 A | 11/1984 | Mifsud | |

(Continued)

FOREIGN PATENT DOCUMENTS

| | | |
|---|---|---|
| EP | 0835462 B1 | 1/2003 |
| GB | 2461298 A | 12/2009 |

(Continued)

OTHER PUBLICATIONS

Search Report issed by the United Kingdom Intellectual Property Office on patent application No. GB1408196.2, dated Oct. 7, 2014, 3 pages.

(Continued)

*Primary Examiner* — Luke Ratcliffe
*Assistant Examiner* — Amie M N'Dure

(57) ABSTRACT

Embodiments related to restriction of gas flow in a marine acoustic vibrator to compensate for gas spring effects. An embodiment provides a marine acoustic vibrator, comprising: an outer shell; and a variable gas flow restrictor disposed within the outer shell; wherein the marine acoustic vibrator has a resonance frequency selectable based at least in part on the variable gas flow restrictor.

17 Claims, 11 Drawing Sheets

(56) References Cited

U.S. PATENT DOCUMENTS

| | | | |
|---|---|---|---|
| 4,556,963 | A | 12/1985 | Hugus et al. |
| 4,557,348 | A | 12/1985 | Mifsud |
| 4,578,784 | A | 3/1986 | Mifsud |
| 4,739,859 | A | 4/1988 | Delano |
| 4,785,430 | A | 11/1988 | Cole |
| 4,853,905 | A | 8/1989 | Myers |
| 5,016,228 | A | 5/1991 | Arnold et al. |
| 5,050,129 | A | 9/1991 | Schultz |
| 5,126,979 | A | 6/1992 | Rowe, Jr. et al. |
| 5,199,005 | A | 3/1993 | Forsberg |
| 5,206,839 | A | 4/1993 | Murray |
| 5,225,731 | A | 7/1993 | Owen |
| 5,233,570 | A | 8/1993 | Donskoy |
| 5,646,380 | A | 7/1997 | Vaage |
| 5,757,726 | A | 5/1998 | Tenghamn et al. |
| 5,757,728 | A | 5/1998 | Tenghamn et al. |
| 5,959,939 | A | 9/1999 | Tengham et al. |
| 5,978,316 | A | 11/1999 | Ambs |
| 6,009,047 | A | 12/1999 | Barger |
| 6,041,888 | A | 3/2000 | Tengham |
| 6,076,629 | A | 6/2000 | Tengham |
| 6,076,630 | A | 6/2000 | Ambs |
| 6,085,862 | A | 7/2000 | Tenghamn |
| 6,173,803 | B1 | 1/2001 | Barger |
| 6,230,840 | B1 | 5/2001 | Ambs |
| 6,556,510 | B2 | 4/2003 | Ambs |
| 6,606,958 | B1 | 8/2003 | Bouyoucos |
| 6,624,539 | B1 | 9/2003 | Hansen et al. |
| 6,711,097 | B1 | 3/2004 | Engdahl |
| 6,851,511 | B2 | 2/2005 | Tenghamn |
| 6,901,028 | B2 | 5/2005 | Clayton et al. |
| 7,142,481 | B1 | 11/2006 | Metzbower et al. |
| 7,164,117 | B2 * | 1/2007 | Breed ............... B60R 21/01516 250/208.1 |
| 7,468,932 | B2 | 12/2008 | Tenghamn |
| 7,539,079 | B2 | 5/2009 | Hoogeveen et al. |
| 7,551,518 | B1 | 6/2009 | Tenghamn |
| 7,562,740 | B2 | 7/2009 | Ounadjela |
| 7,663,502 | B2 * | 2/2010 | Breed .................... B60C 11/24 340/12.25 |
| 7,881,158 | B2 | 2/2011 | Tenghamn |
| 7,926,614 | B2 | 4/2011 | Tenghamn et al. |
| 7,929,380 | B2 | 4/2011 | Wei et al. |
| 7,957,220 | B2 | 6/2011 | Howlid et al. |
| 7,974,152 | B2 | 7/2011 | Tenghamn |
| 8,050,139 | B2 | 11/2011 | Berstad |
| 8,050,867 | B2 | 11/2011 | Johnson et al. |
| 8,061,471 | B2 | 11/2011 | Wei |
| 8,079,440 | B2 | 12/2011 | Laycock |
| 8,081,540 | B2 | 12/2011 | Ross |
| 8,094,514 | B2 | 1/2012 | Tenghamn |
| 8,098,542 | B2 | 1/2012 | Hillesund et al. |
| 8,102,731 | B2 | 1/2012 | Cambois |
| 8,154,176 | B2 | 4/2012 | Karakaya et al. |
| 8,167,082 | B2 | 5/2012 | Eick et al. |
| 8,174,927 | B2 | 5/2012 | Hopperstad et al. |
| 8,189,426 | B2 | 5/2012 | West et al. |
| 8,205,711 | B2 | 6/2012 | Hopperstad et al. |
| 8,261,875 | B2 | 9/2012 | Eick et al. |
| 8,331,198 | B2 | 12/2012 | Morozov et al. |
| 8,335,127 | B2 | 12/2012 | Tenghamn |
| 8,342,288 | B2 | 1/2013 | Eick et al. |
| 8,400,872 | B2 | 3/2013 | Gulgne et al. |
| 8,427,901 | B2 | 4/2013 | Lunde et al. |
| 8,441,892 | B2 | 5/2013 | Morozov et al. |
| 8,446,798 | B2 * | 5/2013 | Tenghamn ............. G10K 9/121 181/113 |
| 8,630,149 | B2 * | 1/2014 | Thompson ............. G01V 1/145 367/143 |
| 8,634,276 | B2 | 1/2014 | Morozov et al. |
| 8,670,292 | B2 | 3/2014 | Engdahl |
| 8,804,462 | B2 | 8/2014 | Barbour et al. |
| 8,971,152 | B2 | 3/2015 | Chelminski |
| 2005/0046584 | A1 * | 3/2005 | Breed .................... B60C 11/24 340/13.31 |
| 2006/0193203 | A1 | 8/2006 | Tenghamn et al. |
| 2008/0253226 | A1 | 10/2008 | Tenghamn et al. |
| 2009/0147626 | A1 | 6/2009 | Vahida et al. |
| 2009/0279387 | A1 | 11/2009 | Tenghamn et al. |
| 2010/0118646 | A1 | 5/2010 | Tenghamn |
| 2010/0118647 | A1 | 5/2010 | Tenghamn |
| 2010/0322028 | A1 | 12/2010 | Tenghamn |
| 2011/0038225 | A1 | 2/2011 | Tenghamn |
| 2011/0069741 | A1 | 3/2011 | Erickson |
| 2011/0075520 | A1 | 3/2011 | Gulgne et al. |
| 2011/0085422 | A1 * | 4/2011 | Thompson ............. G01V 1/145 367/143 |
| 2011/0090759 | A1 | 4/2011 | Laycock |
| 2011/0162906 | A1 | 7/2011 | Harper |
| 2011/0297476 | A1 | 12/2011 | Harper et al. |
| 2011/0317515 | A1 * | 12/2011 | Tenghamn ............. G10K 9/121 367/20 |
| 2012/0048641 | A1 | 3/2012 | Eick et al. |
| 2012/0075955 | A1 | 3/2012 | Dean |
| 2012/0081997 | A1 | 4/2012 | Babour et al. |
| 2012/0113747 | A1 | 5/2012 | Ferber |
| 2012/0147699 | A1 | 6/2012 | Dellinger et al. |
| 2012/0147709 | A1 | 6/2012 | Zowarka, Jr. et al. |
| 2012/0155217 | A1 | 6/2012 | Dellinger et al. |
| 2012/0188845 | A1 | 7/2012 | Jeffryes |
| 2012/0232780 | A1 | 9/2012 | Delson et al. |
| 2012/0314536 | A1 | 12/2012 | Bagaini |
| 2013/0037342 | A1 | 2/2013 | Engdahl |
| 2013/0100777 | A1 * | 4/2013 | Ruet ....................... G01V 1/005 367/141 |
| 2014/0238773 | A1 | 8/2014 | Sallas |
| 2014/0334254 | A1 | 11/2014 | Zrostlik et al. |
| 2014/0334259 | A1 | 11/2014 | Tenghamn |
| 2014/0340985 | A1 | 11/2014 | Tenghamn et al. |
| 2015/0085605 | A1 | 3/2015 | Tenghamn |
| 2015/0085606 | A1 | 3/2015 | Tenghamn et al. |
| 2015/0085607 | A1 | 3/2015 | Tenghamn |
| 2015/0085608 | A1 | 3/2015 | Tenghamn et al. |
| 2015/0234072 | A1 | 8/2015 | McConnell |

FOREIGN PATENT DOCUMENTS

| | | |
|---|---|---|
| WO | 9530912 A1 | 11/1995 |
| WO | 9701770 A1 | 1/1997 |
| WO | 0071266 A1 | 11/2000 |
| WO | 2009153595 | 12/2009 |

OTHER PUBLICATIONS

Feng et al., "A Class IV Flextensional Device Based on Electrostrictive Poly(vinylidene fluoride-trifluoroethylene" 00 Jun. 2003.

Ralph S. Woollett, "Current Approaches to the Miniaturization and Pressure Release Problems of VLF Transducers," Naval Underwater Systems Center, Nov. 5, 1973.

Ralph S. Woollett, "Underwater Helmholtz-Resonator Transducers: General Design Principles," NUSC Technical Aug. 26, 1977.

GB Examination Report for Application GB1408196.2 dated Jan. 5, 2016.

Rune Tenghamn, "PGS Electrical Marine Vibrator," Tech Link, Nov. 2005, pp. 1-3, vol. 5, No. 11, Publication of PGS Geophysical.

Rune Tenghamn and Andrew Long, PGS shows off electrical marine vibrator to capture 'alternative' seismic source market, First Break, Jan. 2006, pp. 11-14, vol. 24.

Rune Tenghman, "Complementing Seismic Source Technology with Marine Vibrators," Presented at PGS Technology day in Oslo, Norway, Oct. 16, 2012.

Fons Ten Kroode et al., "Broadband seismic data—The importance of low frequencies," Geophysics, Mar.-Apr. 2013, pp. WA3-WA14, vol. 78, No. 2.

* cited by examiner

GAS SPRING COMPENSATION MARINE ACOUSTIC VIBRATOR

CROSS-REFERENCE TO RELATED APPLICATIONS

The present application claims the benefit of U.S. Provisional Application No. 61/823,892, filed May 15, 2013, entitled "Air Spring Compensation Marine Acoustic Vibrator," the entire disclosure of which is incorporated herein by reference.

BACKGROUND

Embodiments relate generally to acoustic vibrators for marine seismic surveys. More particularly, embodiments relate to restriction of gas flow in a marine acoustic vibrator to compensate for gas spring effects.

Sound sources are generally devices that generate acoustic energy. One use of sound sources is in marine seismic surveying in which the sound sources may be employed to generate acoustic energy that travels downwardly through water and into subsurface rock. After interacting with the subsurface rock, e.g., at boundaries between different subsurface layers, some of the acoustic energy may be returned toward the water surface and detected by specialized sensors. The detected energy may be used to infer certain properties of the subsurface rock, such as structure, mineral composition and fluid content, thereby providing information useful in the recovery of hydrocarbons.

Most of the sound sources employed today in marine seismic surveying are of the impulsive type, in which efforts are made to generate as much energy as possible during as short a time span as possible. The most commonly used of these impulsive-type sources are air guns that typically utilize compressed air to generate a sound wave. Other examples of impulsive-type sources include explosives and weight-drop impulse sources. Another type of sound source that can be used in seismic surveying includes marine acoustic vibrators, such as hydraulically powered sources, electro-mechanical vibrators, electrical marine acoustic vibrators, and sources employing piezoelectric or magnetostrictive material. Vibrator sources typically generate vibrations through a range of frequencies in a pattern known as a "sweep" or "chirp."

Prior sound sources for use in marine seismic surveying have typically been designed for relatively high-frequency operation (e.g., above 10 Hz). However, it is well known that as sound waves travel through water and through subsurface geological structures, higher frequency sound waves may attenuate more rapidly than lower frequency sound waves, and consequently, lower frequency sound waves can be transmitted over longer distances through water and geological structures than higher frequency sound waves. Thus, efforts have been undertaken to develop sound sources that can operate at low frequencies. Marine acoustic vibrators have been developed that may have least one resonance frequency of about 10 Hz or lower. In order to achieve a given level of output in the water, these marine acoustic vibrators typically need to undergo a change in volume. In order to work at depth while minimizing structural weight, the marine acoustic vibrator may be pressure balanced with external hydrostatic pressure. As the internal gas (e.g., air) in the source increases in pressure, the bulk-modulus of the internal gas also rises. This increase in bulk-modulus or "gas spring" thus tends to make the stiffness of the internal gas a function of the operating depth of the source. Further, the stiffness of the structure and the internal gas are primary determining factors in the source's resonance frequency. Accordingly, the resonance of the marine acoustic vibrator may vary with depth, especially in vibrators where the interior volume of the source may be pressure balanced with the external hydrostatic pressure.

BRIEF DESCRIPTION OF THE DRAWINGS

These drawings illustrate certain aspects of some of the embodiments of the present invention and should not be used to limit or define the invention.

DETAILED DESCRIPTION

Figure 2:
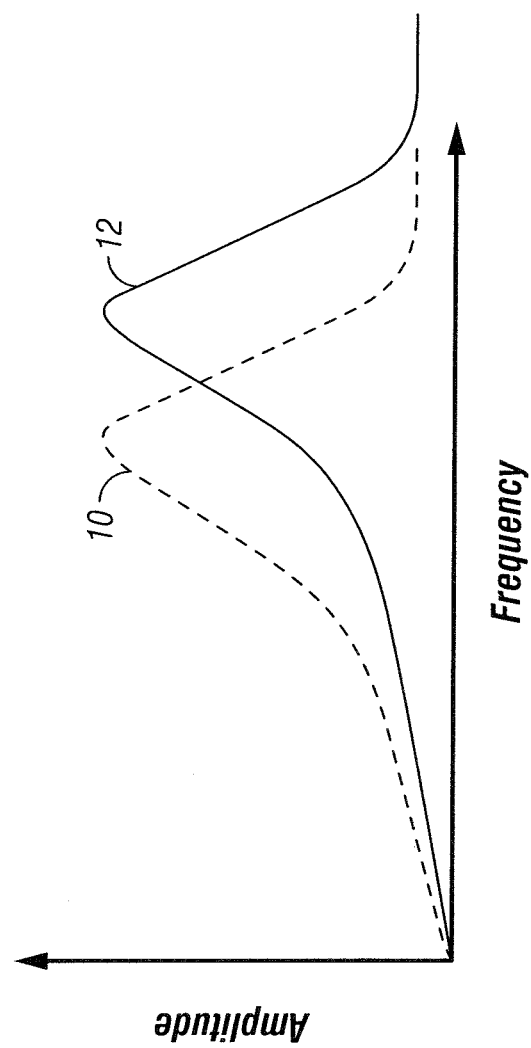
FIGS. 1 and 2 illustrate the effect of the gas spring as the marine acoustic vibrator is being towed deeper in accordance with example embodiments.

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The teen "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Embodiments relate generally to acoustic vibrators for marine seismic surveys. More particularly, in one or more embodiments, gas flow may be restricted in a marine acoustic vibrator to compensate for gas spring effects. As discussed in more detail below, the gas flow in the marine acoustic vibrator may be restricted to make the gas spring more or less stiff to thereby control the first resonance frequency at depth.

Acoustic vibrators may be used in marine seismic surveying to generate acoustic energy that travels downwardly through water and downwardly into the earth. Embodiments of the marine acoustic vibrators may include an outer shell that contains a gas pressure. By way of example, a marine acoustic vibrator may include an outer shell that defines an internal volume in which a gas may be disposed. The gas may be any gas or combination of gases (e.g., air, oxygen, nitrogen, carbon dioxide, etc.) that is selected based on the expected operational requirements of the device. One of ordinary skill in the art with the benefit of this disclosure should be able to select an appropriate gas or combination of gas for use in the marine acoustic vibrator. Examples of suitable marine acoustic vibrators may include hydraulically powered vibrators, electro-mechanical vibrators, electrical marine acoustic vibrators, and vibrators employing piezoelectric or magnetostrictive material. In some embodiments, the marine acoustic vibrator may be a flextensional shell-type source. Flextensional devices including actuators and transducers act as mechanical transformers, which transform and amplify the displacement and force generated in the active element to meet the demands of different applications. Flextensional-shell type sources are generally marine acoustic vibrators having an outer shell that vibrates and flexes to generate acoustic energy. Examples of flextensional-shell type sources can be found in U.S. Pat. No. 8,446,798, which is incorporated herein by reference.

In some embodiments, the marine acoustic vibrator may have a pressure compensation system. The pressure compensation system may be used, for example, to equalize the internal gas pressure of the marine acoustic vibrator's outer shell with the external pressure. The internal gas pressure of the marine acoustic vibrator's outer shell will be referred to herein as the "shell internal gas pressure." Pressure compensation may be used, for example, with marine acoustic vibrators, where the source needs to undergo a change in volume to achieve a given level of output. As the depth of the marine acoustic vibrator increases, the shell internal gas pressure can be increased to equalize pressure with the increasing water pressure due to depth. Air or another suitable gas may be introduced into the outer shell of the vibrator, for example, to increase the internal gas pressure.

However, increasing the shell internal gas pressure may create a "gas spring" effect that impacts the resonance frequency of the marine acoustic vibrator. In particular, the resonance frequency may increase as the shell internal gas pressure increases. The pressurized gas inside a marine acoustic vibrator can have a stiffness higher than that of the outer shell of the sound source in some embodiments. Those of ordinary skill in the art, with the benefit of this disclosure, should appreciate an increase in the shell internal gas pressure may also result in an increase of the bulk modulus (stiffness) of the gas (e.g., air) in the outer shell. As the resonance frequency of the marine acoustic vibrator is based at least on the combination of the stiffness of the outer shell and the stiffness of the gas in the outer shell, this bulk modulus increase impacts the resonance frequency. Thus, the resonance frequency of the marine acoustic vibrator may increase when the vibrator is towed at greater depth.

Figure 1:
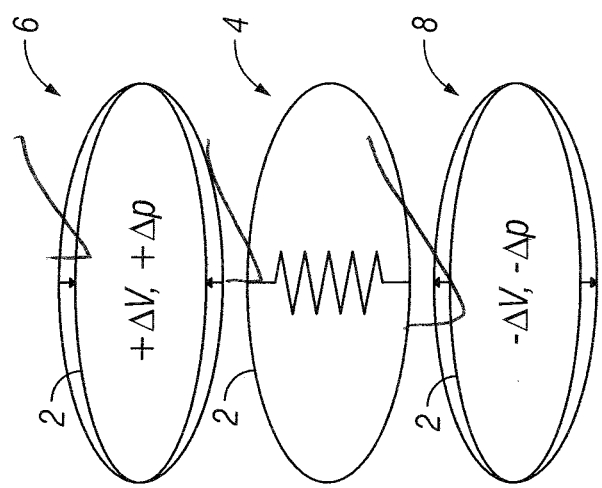

FIGS. 1 and 2 illustrate the effect of a gas spring (e.g., compressed air) on a marine acoustic vibrator at depth in accordance with example embodiments. In FIG. 1, the shell internal gas is represented by reference number 2. To illustrate the gas spring, the shell internal gas 2 is shown neutral at 4, is under compression at 6, and is under expansion at 8. With respect to FIG. 2, the curve shown at 10 is a hypothetical representation of the output of a marine acoustic vibrator at D meters without pressure compensation, while the curve shown at 12 represents the output of the marine acoustic vibrator at D+x meters with pressure compensation. Pressure compensation causes an increase in pressure and resulting increasing in the stiffness of the gas spring. As illustrated, the resonance of the marine acoustic vibrator shifts higher with pressure compensation, thus showing how a stiff gas spring may result in a higher resonance frequency.

Figure 3:
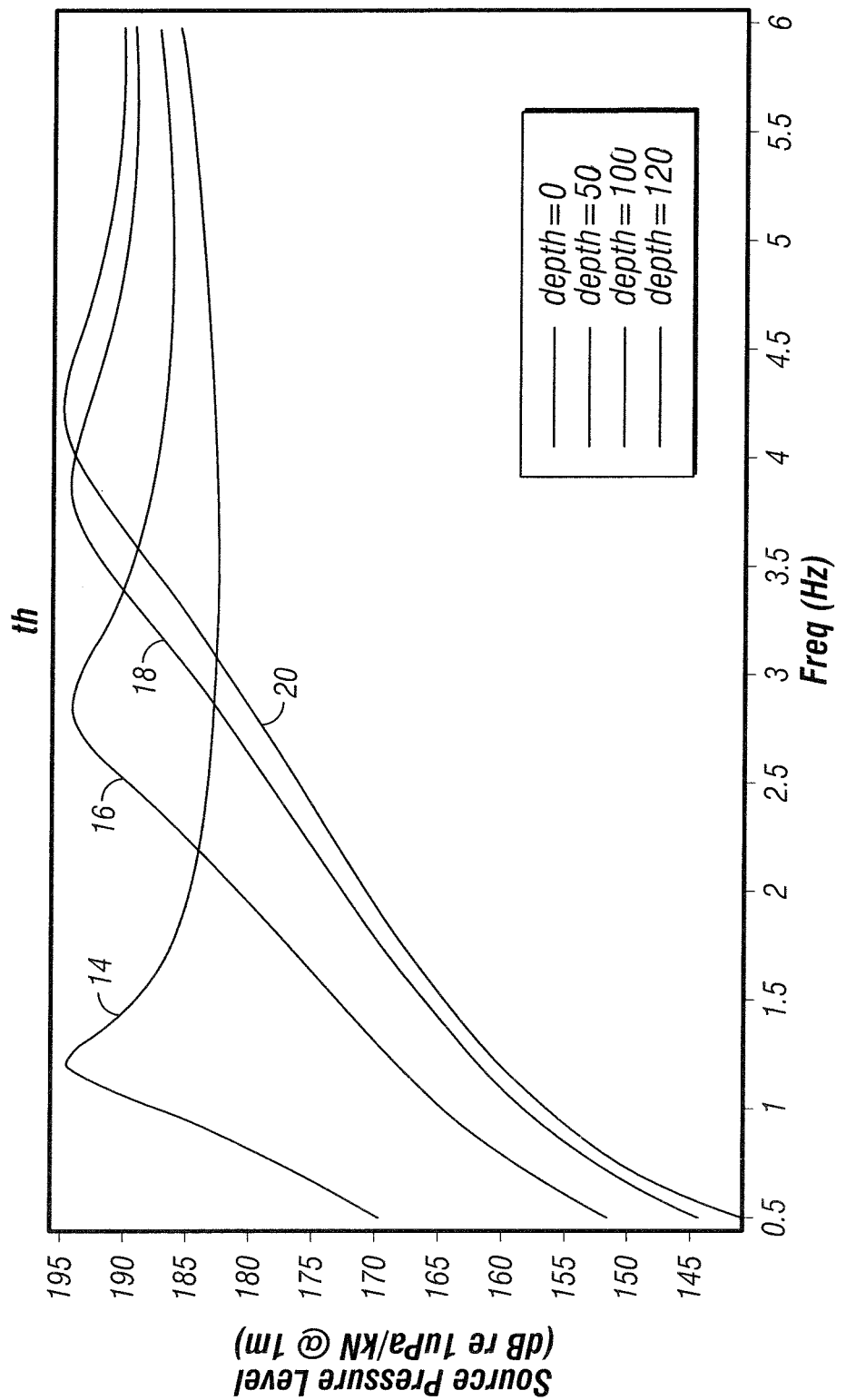
FIG. 3 is a simulated amplitude spectra showing the expected effect of compressed gas that generates a gas spring as the marine acoustic vibrator is being towed deeper in accordance with example embodiments.

FIG. 3 is a simulated amplitude spectrum from a finite element simulation showing the effect of the gas spring as a function of depth. The curves in FIG. 3 represent the output of a marine acoustic vibrator towed at varying depth with pressure compensation. In particular, the curves in FIG. 3 represent the output of the marine acoustic vibrator towed at 0 meters, 50 meters, 100 meters, and 120 meters, respectively, shown at 14, 16, 18, and 20 in FIG. 3. As illustrated, the increase in resonance frequency may be more pronounced at greater depths, thus indicating that the resonance frequency increases as the gas spring is made stiffer.

In accordance with present embodiments, the gas spring may be controlled by restricting gas flow in the marine acoustic vibrator. By way of example, a variable gas restrictor may be disposed within the marine acoustic vibrator that can change the internal gas volume to make the gas spring more or less stiff. As the stiffness of the gas spring impacts the resonance frequency, the gas spring may be changed to thereby control the resonance frequency. This may be particularly desirable with a marine acoustic vibrator that may be towed at different depths. In some embodiments, it may be desirable to have the resonance frequency remain substantially constant (e.g., vary by no more than 5%) regardless of depth. However, as previously described, when the marine acoustic vibrator may be lowered down into the water, the gas may be compressed by the pressure compensation system such that the gas spring may become stiffer at increasing depths. For example, a marine acoustic vibrator having a resonance of 2.5 Hz at 120 meters, may have a much lower resonance at 50 meters. To compensate for this gas spring effect, the gas flow in the marine acoustic vibrator may be restricted at shallower depths to make the gas spring stiffer, thus increasing the resonance frequency.

In some embodiments, the marine acoustic vibrator may display at least one resonance frequency (when submerged in water at a depth of from about 0 meters to about 300 meters) between about 1 Hz to about 200 Hz. In alternative embodiments, the marine acoustic vibrator may display at least one resonance frequency (when submerged in water) between about 0.1 Hz and about 100 Hz, alternatively, between about 0.1 Hz and about 10 Hz, and alternatively, between about 0.1 Hz and about 5 Hz. In some embodiment, the marine acoustic vibrator may display at least two resonance frequencies of about 10 Hz or lower (when submerged in water). In some embodiments, the first resonance frequency may be controlled by restricting gas flow in the marine acoustic vibrator. In particular embodiments, the first resonance frequency may be increased by restriction of gas flow in the marine acoustic vibrator. By way of example, the first resonance frequency may be controlled to be substantially constant regardless of depth.

Figure 4:
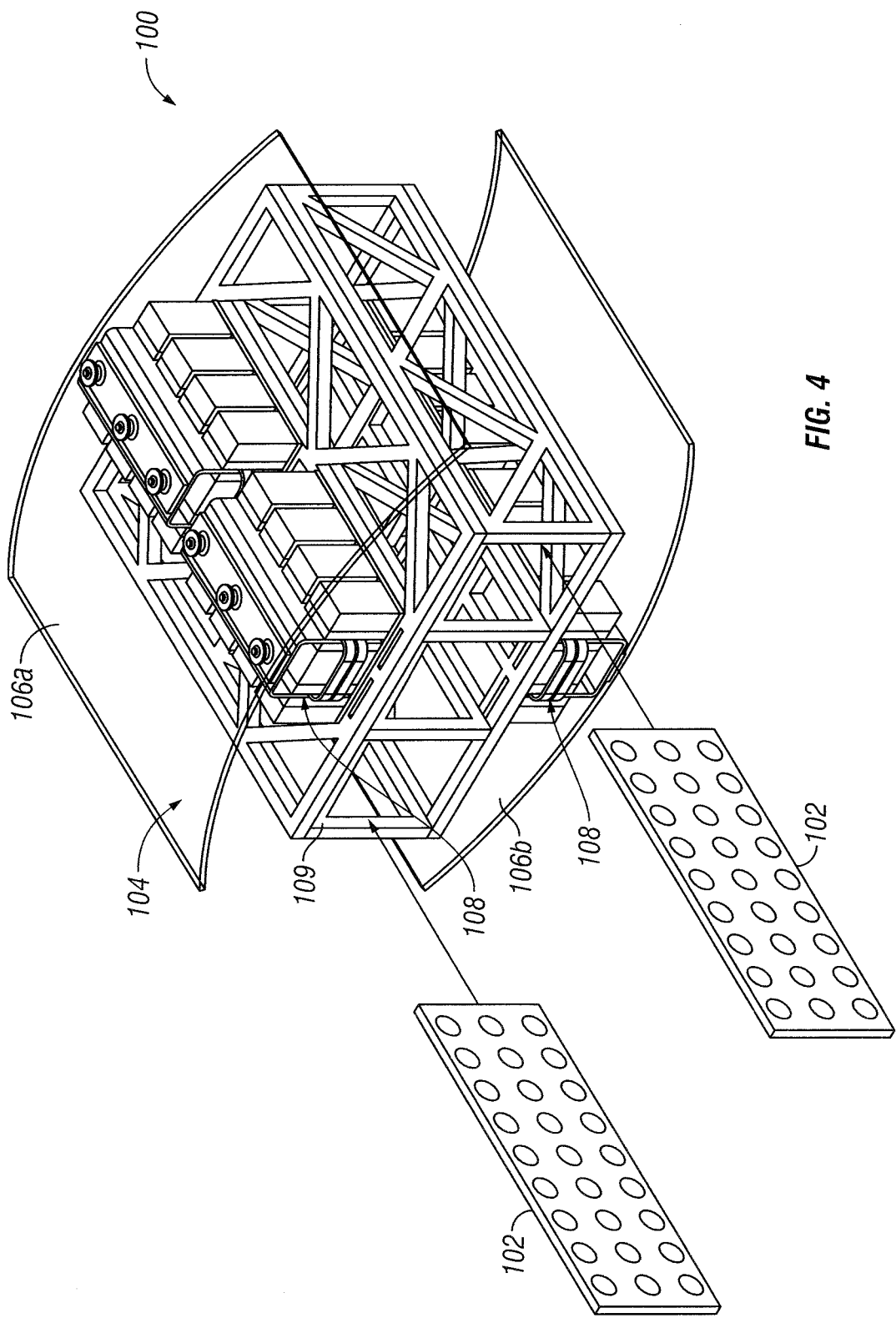
FIG. 4 illustrates an example embodiment of a marine acoustic vibrator with a variable gas flow restrictor.

FIG. 4 illustrates an example embodiment of a marine acoustic vibrator 100 that includes a variable gas restrictor 102, for example, to restrict gas flow and, thus, compensate for gas spring effects. In the illustrated embodiment, the marine acoustic vibrator 100 is a flextensional shell-type source. As illustrated, the marine acoustic vibrator 100 may include an outer shell 104, which may be formed, for example, by two shell side portions 106a, 106b. While not shown on FIG. 4, the shell side portions 106a, 106b may be joined at or near the ends of their longer, major axes by a suitable coupling mechanism, such as hinges. As illustrated, the marine acoustic vibrator 100 may further include one or more drivers 108, which may be an electro-dynamic drive, for example. The outer shell 104 together with the drivers 108 may be operable to determine a first resonance frequency for the marine acoustic vibrator. The drivers 108 may be connected to the face of the two shell side portions 106a, 106b. As illustrated, the marine acoustic vibrator 100 may further include a fixture 109 capable of suspending the drivers 108 within the outer shell 104. In the illustrate embodiment, the fixture 109 may be in the form of a frame.

In the cut-away illustration of FIG. 4, the variable gas restrictor 102 is disposed within the outer shell 104. As illustrated, the variable gas restrictor 102 may be secured to the fixture 109. In example embodiments, the variable gas restrictor 102 has a sliding-plate structure being movable between a closed position and an open position. In the closed or partially closed position, the variable gas restrictor 102 may be used to restrict gas flow in the outer shell 104. In some embodiments, the variable gas restrictor 102 may completely seal off a portion of the internal volume of the outer shell 104. Accordingly, the gas flow may be restricted when desired to make the gas spring stiffer, which may desired in some embodiments. By way of example, it may be desired to make the gas spring stiffer and thus increase the first resonance frequency at shallow depths. This type of gas spring compensation may be performed, for example, when a substantially constant resonance frequency is desired regardless of depth. Without gas spring compensation, the gas spring would stiffen as the marine acoustic vibrator 100 is lowered in the water, thereby causing the first resonance frequency to vary with depth. However, present embodiments may provide a resonance frequency for the marine acoustic vibrator 100 selected based at least in part on the variable gas restrictor 102 such that the marine acoustic vibrator 100 may have a substantially constant resonance frequency regardless of depth.

Figure 5:
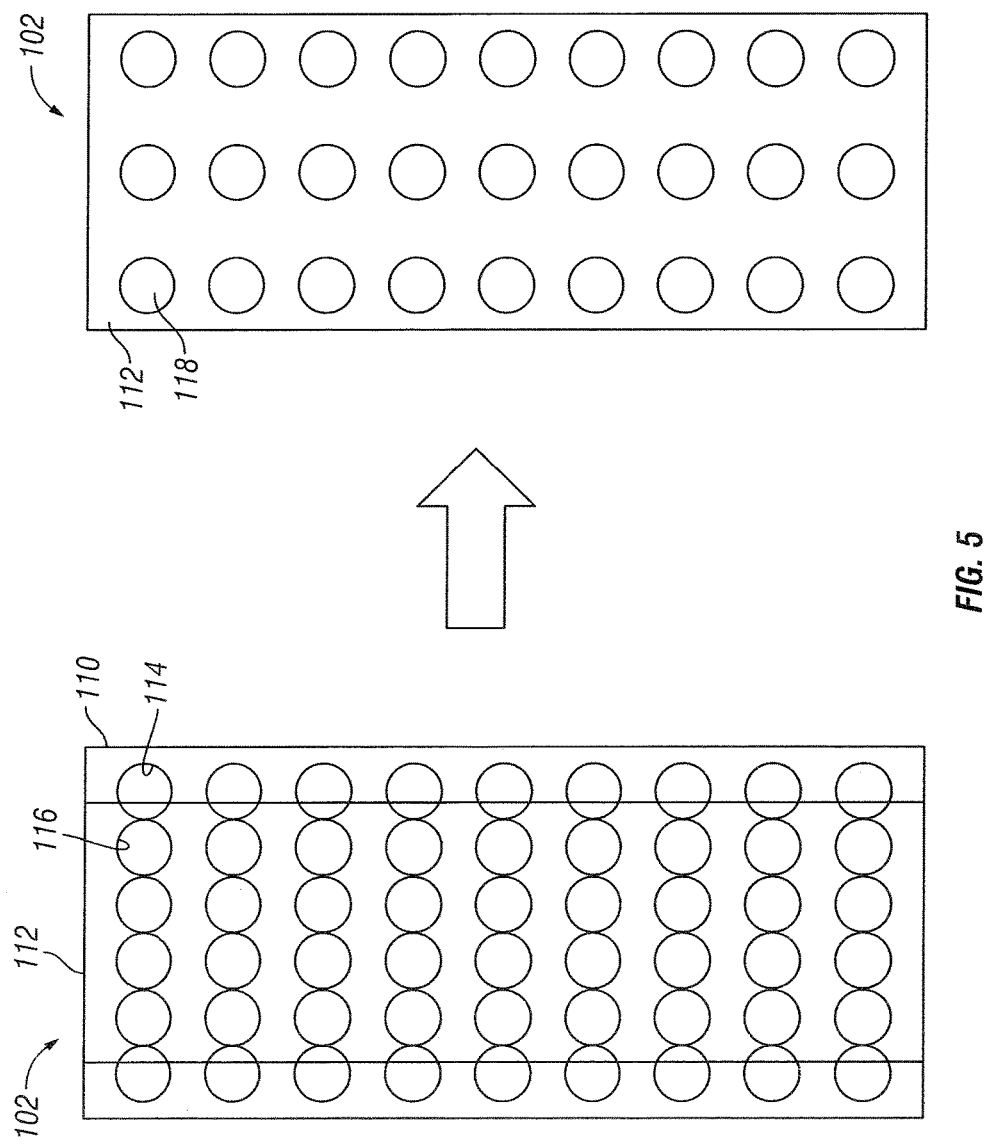
FIG. 5 illustrates an example embodiment of a variable gas flow restrictor for use with a marine acoustic vibrator.

With reference now to FIG. 5, an example embodiment of a variable gas restrictor 102 will now be described in more detail. As illustrated, the variable gas restrictor 102 may have a sliding plate structure that comprises a first plate 110 and a second plate 112. The first plate 110 may comprise holes 114, and the second plate 112 may also comprise holes 116. The first plate 110 and second plate 112 as illustrated may each be generally rectangular in shape in some embodiments, but other plate configurations may be suitable including square, circular, elliptical, or irregular-shaped structures. The number of the holes 114 in the first plate 110 and the holes 116 in the second plate 112 may be selected in order to obtain the desired amount of gas flow. Each of the holes 114 and holes 116 may have a selected diameter and spacing based on the desired amount of gas flow and desired resonance frequency, among others. For example, hole size may be reduced with increased spacing if less gas flow is desired while hole size may be increased with reduced spacing if more gas flow is desired.

The variable gas restrictor 102 may be moveable from (or to) a closed or partially closed position (e.g., left side of FIG. 5) to (or from) an open position (e.g., right side of FIG. 5). In the open position, the holes 114 in the first plate 110 may be aligned with the holes 116 in the second plate 112 such that through holes 118 are formed in the variable gas restrictor 102 allowing maximum gas flow. In the closed position, the holes 114 in the first plate 110 may be at least partially restricted by the second plate 112 thus restricting gas flow in through holes 118. By movement of the second plate 112, the hole size of the through holes 118 may be reduced, restricting gas flow. In other words, the second plate 112 may be positioned to effectively limit the size of the through holes 18. In some embodiments as shown on FIG. 5, the second plate 112 may be positioned to partially close the variable gas restrictor 102 such that the holes 114 in the first plate 110 are substantially blocked. An electric drive, pneumatic drive, hydraulic drive, or other suitable drive may be in used in control of the variable gas restrictor 102. A linkage (not shown) may couple the variable gas restrictor 102 to a control system that may be operable to control the position of the second plate 112 and thus the gas flow. The variable gas restrictor 102 may be controlled, for example, to maintain a substantially constant resonance frequency as the depth of the marine acoustic vibrator 100 changes. For example, the variable gas restrictor 102 may be closed as the frequency increases to maintain a constant resonance frequency. In some embodiments, the variable gas restrictor 102 may be passively driven, for example, based on a pressure sensor. In some embodiments, the variable gas restrictor 102 may be remotely controlled from the tow vessel or a work boat (e.g., survey vessel 200 on FIG. 13). In some embodiment, the variable gas restrictor 102 may be fixed in place in some operations. It should be understood that the first plate 110 may be moveable in some embodiments while the second plate 112 remains stationary. As an alternative to the second plate 112, each of the holes 114 in the first plate 110 may be fitted with louvers or another suitable covering (e.g., flapper, guillotine device, etc.) that may be controlled to permit or restrict gas flow through the holes 114. Although FIG. 5 illustrates the variable gas restrictor 102 as a sliding-plate structure, other suitable mechanisms for restricting gas flow in the marine acoustic vibrator 100 may be used in accordance with example embodiments, including hinged doors, roll-up doors, and the like. For example, a device (e.g., plate, door, etc.) may be used to seal off a portion of the internal volume available to the gas spring.

Figure 6:
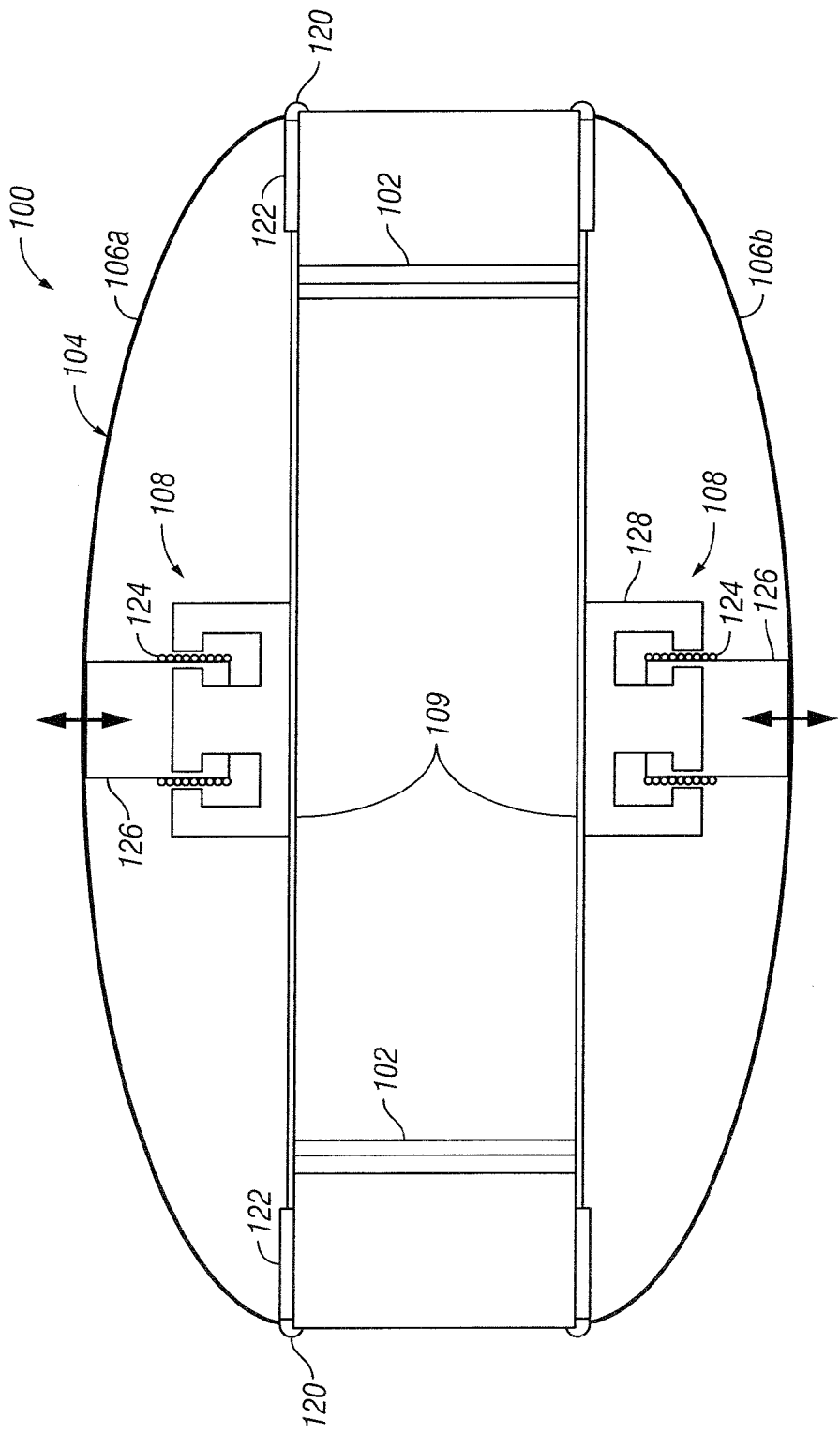
FIG. 6 illustrates an example embodiment of a marine acoustic vibrator with a variable gas flow restrictor in cross-section.

FIG. 6 illustrates a marine acoustic vibrator 100 that includes a variable gas restrictor 102. The marine acoustic vibrator 100 of FIG. 6 is shown in cross-section. As illustrated the marine acoustic vibrator 100 includes an outer shell 104, which may be made from spring steel or similar resilient metal, and which may be a class V flextensional transducer. In the illustrated embodiment, the form of the outer shell 104 may be generally referred to as being flextensional. As illustrated, the outer shell 104 may be formed, for example, by two shell side portions 106a, 106b joined at or near the ends of their longer, major axes by respective hinges 120 in particular embodiments. In particular embodiments, the outer shell 104 may act as a spring having a first spring constant to generate a first resonance frequency. As would be understood by one of ordinary skill in the art with the benefit of this disclosure, the spring constant of the outer shell 104 may be determined by its dimensions, material make-up, and shape in relaxed state, for example. Although FIG. 6 depicts a flextensional shell of essentially semi-elliptical shape, flextensional shells of other shapes, including convex, concave, flat, or combinations thereof may also be suitable. In some embodiments, the dimensions, material make-up, and shape of the outer shell 104 may be selected to provide a soft spring constant for vibrations of between about 1-10 Hz when the marine acoustic vibrator 100 is submerged in water at a depth of from about 0 meters to about 300 meters.

As illustrated, the marine acoustic vibrator 100 may further include a driver 108, which may be an electro dynamic driver. The outer shell 104 together with the driver 108 may be operable to determine a first resonance frequency of the marine acoustic vibrator 100. In some embodiments, the driver 108 may be a "moving coil" or "voice coil" driver, which may provide the ability to generate very large acoustic energy amplitudes. Although the particular embodiment described herein shows a bi-directional driver, embodiments with one or more uni-directional drivers or in which a plurality of drivers are utilized in parallel, are within the scope of the invention. The driver 108 may be connected to the face of the two shell side portions 106a, 106b. For example, as illustrated in FIG. 6, the driver 108 may be connected at approximately the vertical mid-point of the face of outer shell 104, proximate the ends of the shorter, minor axes of the shell side portions 106a, 106b.

In some embodiments, the marine acoustic vibrator 100 further may include a fixture 109 capable of suspending driver 108 within outer shell 104. For example, in the illustrated embodiment, the fixture 109 extends along the major axis of outer shell 104 and may be coupled to the outer shell 104 with linear bearings 122. In some embodiments, the fixture 109 may be circular in cross section and may be mounted to the hinges 120 using the linear bearings 122. Such mounting may enable contraction of the major axis of the outer shell 104 when the minor axis is enlarged by the motion of the driver 108.

As illustrated, the driver 108 may comprise a bi-directional, moving coil driver, having two sets of electric coil 124, transmission element 126, and magnetic circuitry 128, which are capable of generating a magnetic field. As illustrated, the magnetic circuitry 128 may be connected to the fixture 109, while the transmission element 126 may connect to the outer shell 104. In some embodiments (not illustrated), this arrangement may be reversed (i.e., the magnetic circuitry 128 connects to the outer shell 104, while the transmission element 126 connects to the fixture 109). By attaching the heavier part (magnetic circuitry 128) of the driver 108 to the outer shell 104, it may be easier to generate low frequencies without having to make the outer shell 104 too weak to allow for a soft spring constant. As illustrated, each transmission element 126 may transfer motion of electric coil 124 to the inner surface of outer shell 104 proximate its minor axis. When electrical current I is applied to the electric coil 124, a force F acting on electric coil 124 may be generated as follows:

$$F = IlB \quad \text{(Eq. 1)}$$

Where I is the current, l is the length of the conductor in the electric coil 124, and B is the magnetic flux generated by the magnetic circuitry 128. By varying the magnitude of the electrical current and consequently the magnitude of the force acting on the electric coil 124, the length of the driver stroke should vary. The driver 108 may provide stroke lengths of several inches up to and including about 10"—which may allow the marine acoustic vibrator 100 to generate enhanced amplitude acoustic output in the low frequency ranges, for example, between about 1 Hz about 100 Hz, and more particularly, between about 1 and 10 Hz when the marine acoustic vibrator 100 is submerged in water at a depth of from about 0 meters to about 300 meters. Often, the magnetic circuitry 128 may comprise permanent magnets, though any device capable of generating a magnetic flux may be incorporated.

In the illustrated embodiment, the marine acoustic vibrator 100 further includes the variable gas restrictor 102 disposed within the outer shell 104. As illustrated, the variable gas restrictor 102 may be secured to the fixture 109. As previously described, the variable gas restrictor 102 may be moveable between an open position and a closed position to restrict gas flow in the outer shell 104. By way of example, restriction of gas flow may be used to increase the first resonance frequency by stiffening the gas spring.

As would be understood by one of ordinary skill in the art, the total impedance that may be experienced by a marine acoustic vibrator 100 may be expressed as follows:

$$Z_r = R_r + jX_r \quad \text{(Eq. 2)}$$

where $Z_r$ is total impedance, $R_r$ is radiation impedance, and $X_r$ is reactive impedance.

In an analysis of the energy transfer of the marine acoustic vibrator 100, the system may be approximated as a baffled piston. In the expression of the total impedance that will be experienced, the radiation impedance $R_r$ of a baffled piston may be:

$$R_r = \pi a^2 \rho_o c R_1(x) \quad \text{(Eq. 3)}$$

and the reactive impedance may be:

$$X_r = \pi a^2 \rho_o c X_1(x) \quad \text{(Eq. 4)}$$

where $$x = 2ka = (4\pi a/\lambda) = (2\omega a/c) \quad \text{(Eq. 5)}$$

and where $$R_1(x) = 1 - (2/x)J_{1(x)} \text{ and} \quad \text{(Eq. 6)}$$

$$X_1(x) = \left(\frac{4}{\pi}\right) \int_0^{\pi/2} \sin(x\cos\alpha)\sin^2\alpha \, d\alpha \quad \text{(Eq. 7)}$$

where $\rho_o$ is the density of water, $\omega$=radial frequency, k=wave number, a=radius of piston, c=sound velocity, $\lambda$=wave length, and $J_1$=Bessel function of the first order.

Using the Taylor series expansion on the above equations yields the following:

$$R_1(x) = \frac{x^2}{2^2 1! 2!} - \frac{x^4}{2^4 2! 3!} + \ldots \quad \text{(Eq. 8)}$$

$$X_1(x) = \frac{4}{\pi}\left(\frac{x}{3} - \frac{x^3}{3^2 5} + \frac{x^5}{3^2 5^2 7} - \ldots\right) \quad \text{(Eq. 9)}$$

For low frequencies, when x=2ka is much smaller than 1, the real and imaginary part of the total impedance expression may be approximated with the first term of the Taylor expression. The expressions for low frequencies, when the wave length is much larger than the radius of the piston becomes:

$$R_1(x) = (1/2)(ka)^2 \quad \text{(Eq. 10)}$$

$$X_1(x) \to (8ka)/(3\pi) \quad \text{(Eq. 11)}$$

It follows that, for low frequencies, R will be a small number compared to X, which suggests a very low efficiency signal generation. However, embodiments may introduce a resonance in the lower end of the frequency spectrum so that low frequency acoustic energy may be generated more efficiently. At resonance, the imaginary (reactive) part of the impedance is cancelled, and the marine acoustic vibrator 100 may be able to efficiently transmit acoustic energy into the body of water.

In some embodiments, the marine acoustic vibrator 100 may display at two resonance frequencies (when submerged in water at a depth of from about 0 meters to about 300 meters) in the seismic frequency range of interest, for example, between about 1 Hz to about 200 Hz. In particle embodiments, the marine acoustic vibrator 100 may display two resonance frequencies (when submerged in water) between about 0.1 Hz and about 100 Hz, alternatively, between about 0.1 Hz and about 10 Hz, and alternatively, between about 0.1 Hz and about 5 Hz. As previously described, the first resonance frequency may be controlled by restricting gas flow in the marine acoustic vibrator 100. In particular embodiments, the first resonance frequency may be increased by restriction of gas flow in the marine acoustic vibrator 100. By way of example, the first resonance frequency may be controlled to be substantially constant regardless of depth.

Figure 7:
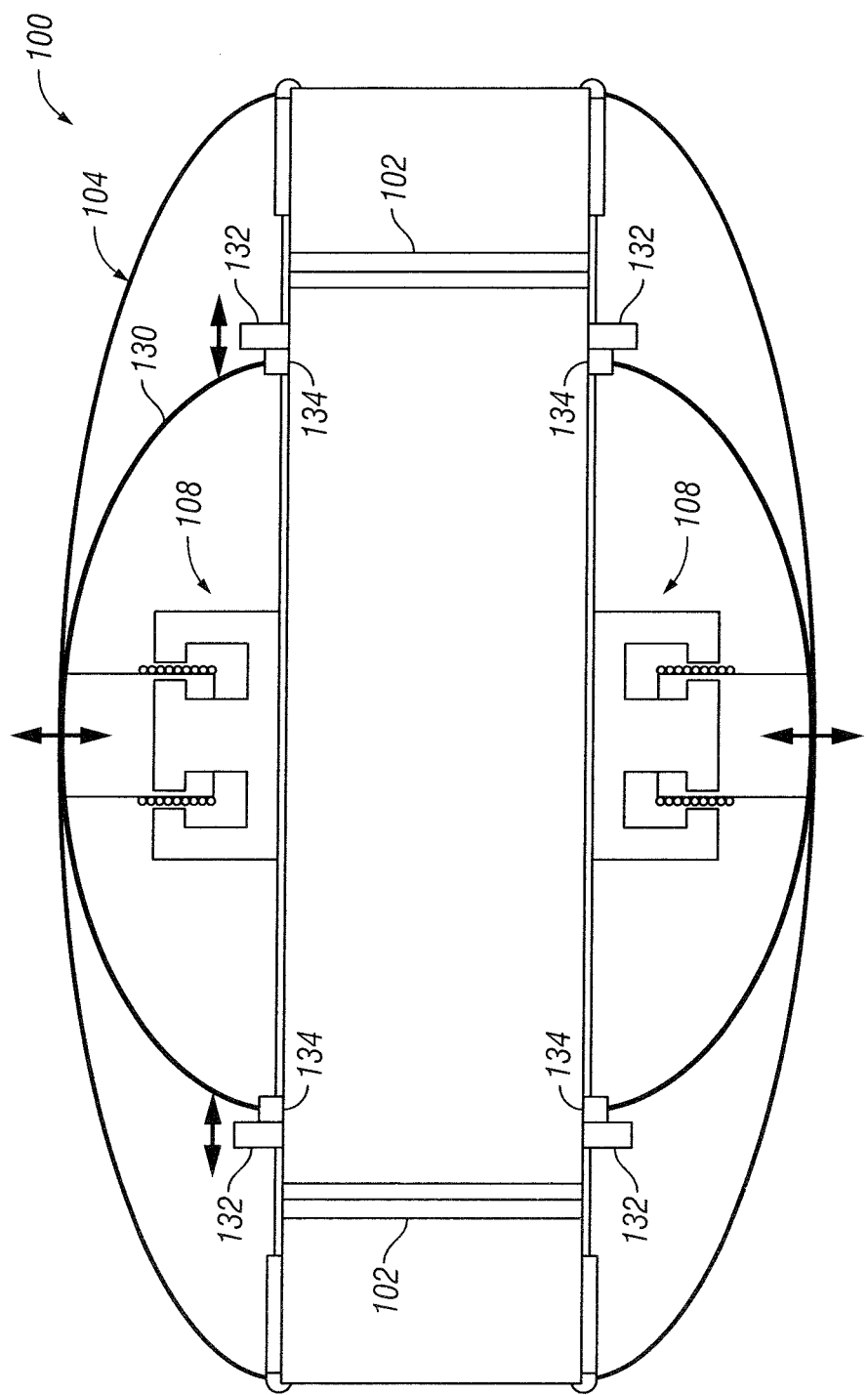
FIG. 7 illustrates another example embodiment of a marine acoustic vibrator with a variable gas flow restrictor in cross-section.

FIG. 7 illustrates another embodiment of a marine acoustic vibrator 100 including a variable gas restrictor 102. In the illustrated embodiment, the marine acoustic vibrator 100 further includes a spring 130 inside the outer shell 104 with masses 132 attached thereto along the ends of the major axis and slidably supported on the fixture 109 using linear bearing 134. As illustrated, the spring 130 may be generally elliptically shaped. The spring 130 may be coupled to the outer shell 104 proximate the minor axis of each. In the illustrated embodiment, the driver 108 may be coupled to the outer shell 104. The spring 130 with the masses 132 may cause a second system resonance frequency when the marine acoustic vibrator 100 is submerged in water at a depth of from about 0 meters to about 300 meters within the seismic frequency range of interest (e.g., between about 1 Hz and about 10 Hz). Although a marine acoustic vibrator 100 as shown in FIG. 6 that included only the outer shell 104 acting as a spring would typically display a second resonance frequency, for systems having a size suitable for use in geophysical exploration, the second resonance frequency when the marine acoustic vibrator 100 is submerged in water would typically be much higher than the frequencies within the seismic frequency range of interest.

Figure 8:
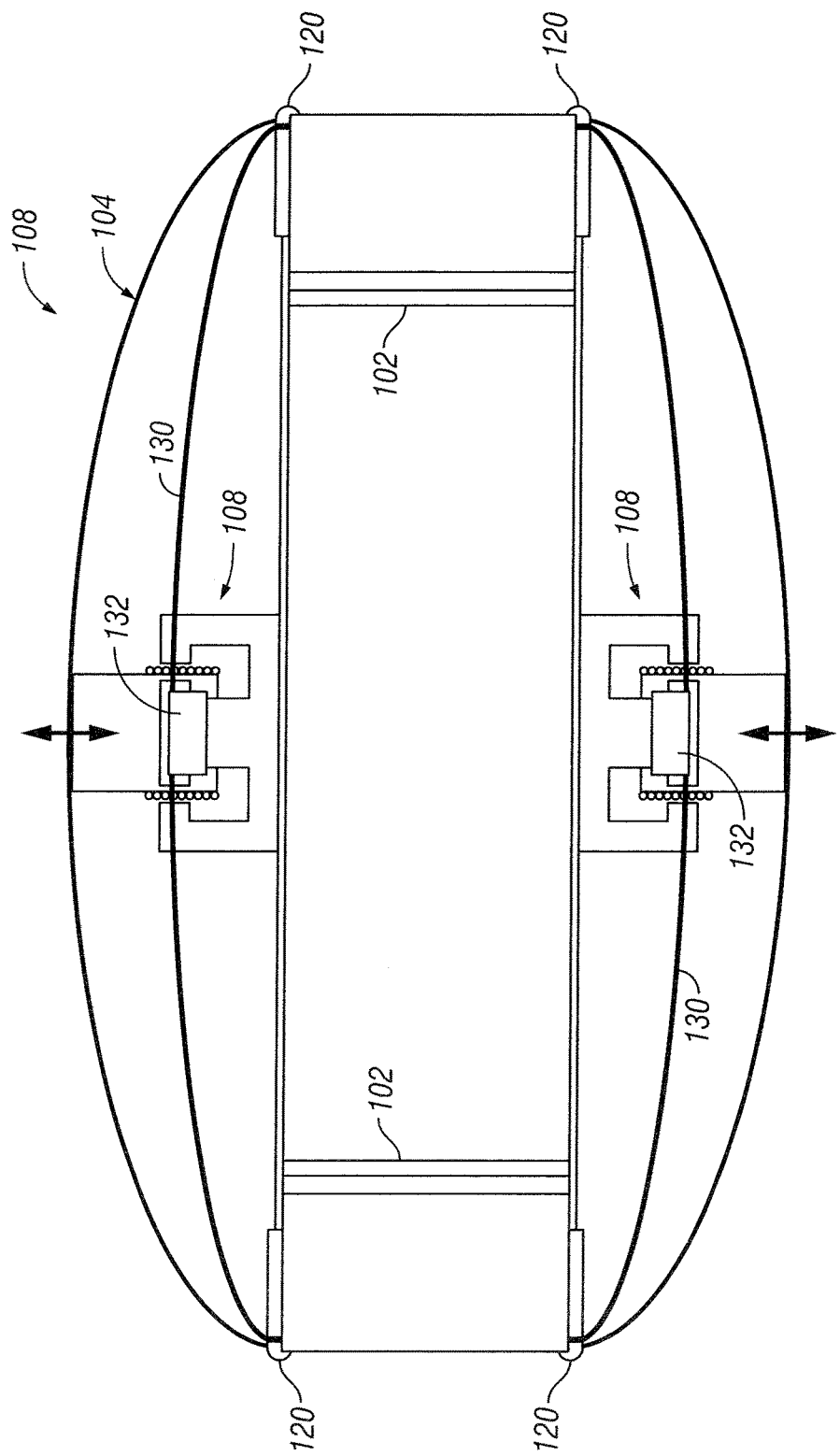
FIG. 8 illustrates yet another example embodiment of a marine acoustic vibrator with a variable gas flow restrictor in cross-section.
Figure 9:
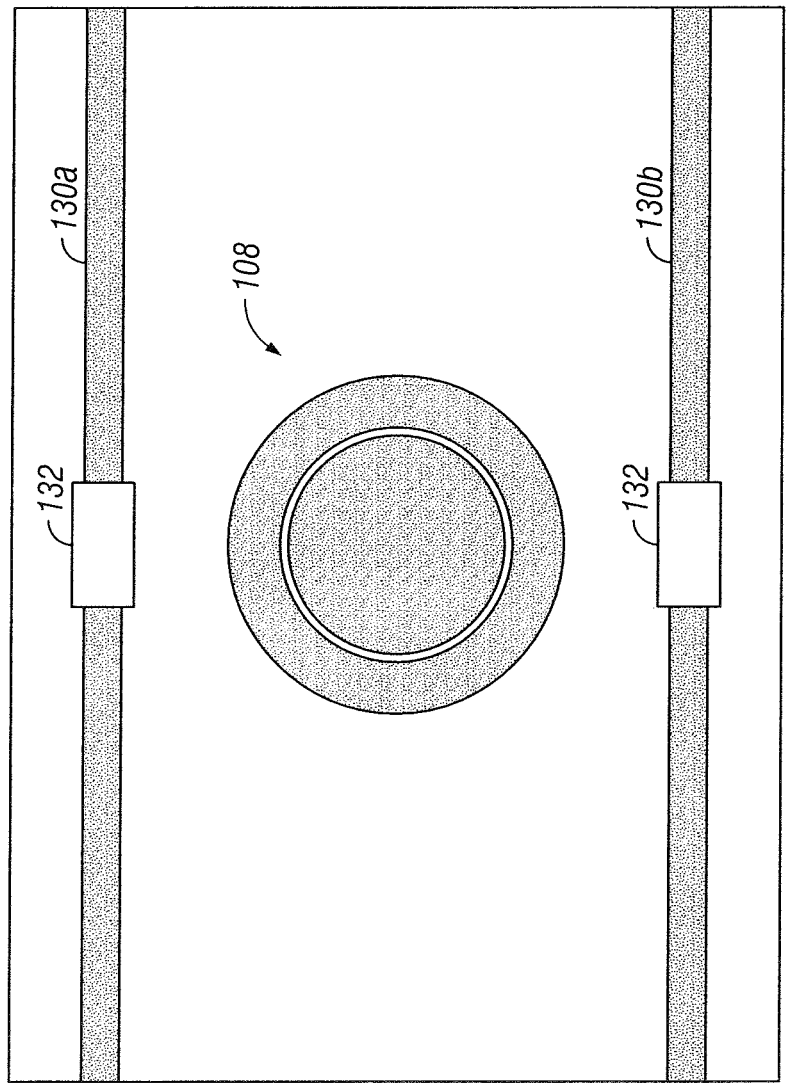
FIG. 9 is a top view of the marine acoustic vibrator of FIG. 8 in accordance with example embodiments.

FIG. 8 illustrates yet another embodiment of a marine acoustic vibrator 100 having a variable gas restrictor 102. In the illustrated embodiment, the major axis ends of the spring 130 may be coupled to the major axis ends of the outer shell 104 at the hinges 120. Masses 132 may be affixed to the spring 130 proximate its minor axis. As illustrated in FIG. 9, the spring 130 may be vertically divided into two springs 130a, 130b, each with added masses 132. In the illustrated embodiment, one spring 130a is disposed above driver 108, while the other inner spring 130b is disposed below driver 108, and driver 108 remains coupled to outer shell 104, as shown on FIG. 8.

In evaluating gas spring effects, finite element analysis may be utilized as known to those of ordinary skill in the art. In such an analysis, the following principles may be relevant. If the outer shell 104 of the marine acoustic vibrator 100 is approximated as a piston, then, for low frequencies, the mass load, or the equivalent fluid mass acting on the shell may be:

$$M_{shell} = \rho_o(8a^3/3) \quad \text{(Eq. 12)}$$

where $M_{shell}$ is the mass load of the outer shell 104, $\rho_o$ is the density of water, and a is the equivalent radius for a piston which corresponds to the size of the outer shell 104. The outer shell 104 may also have a spring constant, for example, in the direction of the moving electrical coils of the marine acoustic vibrator 100.

The stiffness of the entrained gas (gas spring) may be described by the following general formula:

$$K_{variablegasspring} = \Delta \text{Volume/Volume} * P * \gamma \quad \text{(Eq. 13)}$$

where: $K_{variablegasspring}$ is the gas spring value, Volume is the internal volume of the marine acoustic vibrator 100, $\Delta$Volume is the change in volume due to the action of the marine acoustic vibrator 100, P is the absolute pressure of the gas inside the marine acoustic vibrator 100, and $\gamma$ is the adiabatic constant which is a unique property dependent on the chemical composition of the gas.

Therefore, when accounting for the gas spring effects, the first resonance frequency, $f_{resonance-1}$, due to interaction of the outer shell 104 acting as a spring may be substantially determined by the following mass spring relationship:

$$f_{resonance-1} = \frac{1}{2\pi} \sqrt{\frac{K_{shell} + K_{variableairspring}}{M_{shell} + M_{driver}}} \quad \text{(Eq. 14)}$$

where $K_{shell}$ is the spring constant of the outer shell 104, $K_{variablegasspring}$ is the gas spring value determined by the change in gas volume using, for example, Equation 13 above, $M_{driver}$ is the mass load of the driver, and $M_{shell}$ is the mass load of the outer shell 104. Accordingly, it may be possible, as shown above, to adjust the first resonance frequency by compensating for the gas spring. By restriction of the gas flow in the outer shell 104, the effective volume of gas can be changed, which results in a change in the gas spring value. The first resonance frequency should also change as the gas spring value has also changed. For example, a stiffer gas spring due to an increase in pressure or a reduction in basic volume of gas will have a higher gas spring value thus causing a corresponding increase in the first resonance frequency.

To achieve efficient energy transmission in the seismic frequency range of interest, it may be desirable to achieve a second resonance frequency within the seismic frequency range of interest. In the absence of the spring 130 with its added masses 132, the second resonance frequency would occur when the outer shell 104 has its second Eigen-mode. This resonance frequency, however, is normally much higher than the first resonance frequency, and accordingly, would typically be outside the seismic frequency range of interest. As is evident from the foregoing equation, the resonance frequency will be reduced if the mass load on the outer shell 104 is increased. However, in order to add sufficient mass to achieve a second resonance frequency within the seismic frequency range of interest, the amount of mass that would need to be added to the outer shell 104 may make such a system less practical for use in marine seismic operations.

In some embodiment, the spring 130 is included inside the outer shell 104 with added masses 132 on the side of the spring 130. The spring 130 may have a transformation factor $T_{spring}$ between the long and short axis of its ellipse, so that the deflection of the two side portions will have a higher amplitude than the deflection of the end attached to the outer shell 104 and the driver 108.

The effect of such added masses 132 may be equivalent to adding mass in the end of the driver 108 where it is attached to the outer shell 104.

$$M_{spring} = (T_{spring})^2 \cdot M_{added} \qquad \text{(Eq. 15)}$$

Wherein $M_{spring}$ is the mass of the spring, $T_{spring}$ is the spring's transformation factor, and $M_{added}$ is the mass of the added mass 132.

Use of the spring 130, with the added masses 132, may allow the second resonance frequency of the system to be tuned so that the second resonance frequency is within the seismic frequency range of interest, thereby improving the efficiency of the marine acoustic vibrator 100 in the seismic band.

$$f_{resonance2} = \frac{1}{2\pi} \sqrt{\frac{K_{spring} + K_{shell}}{(T_{spring})^2 \cdot M_{added} + M_{shell}}} \qquad \text{(Eq. 16)}$$

where $K_{spring}$ is the spring constant of spring 130, $K_{shell}$ is the spring constant of outer shell 104, $T_{spring}$ is the spring's transformation factor, $M_{added}$ is the mass of the added mass 132, and $M_{shell}$ is the mass load on the outer shell 104.

Accordingly, it may be possible, as shown above, to select the added mass 132 on the spring 130 to tune the second resonance frequency. It may also be possible to select the extent of influence the second resonance frequency should have on the system. By way of example, if the spring 130 has a low spring constant compared to the outer shell 104, and a matching mass 132 is added to the spring 130, the spring 130 with its mass 132 will function relatively independently from the outer shell 104. In such cases, the second resonance frequency may be as follows:

$$f_{resonance2} = \frac{1}{2\pi} \sqrt{\frac{K_{spring}}{(T_{spring})^2 \cdot M_{added}}} \qquad \text{(Eq. 17)}$$

In the same way, it may also be possible in some embodiments to make the second resonance frequency very large by selecting a high spring constant for the spring 130 with a matching mass 132 such that the second resonance frequency will have a larger amplitude than the first resonance frequency.

Figure 10:
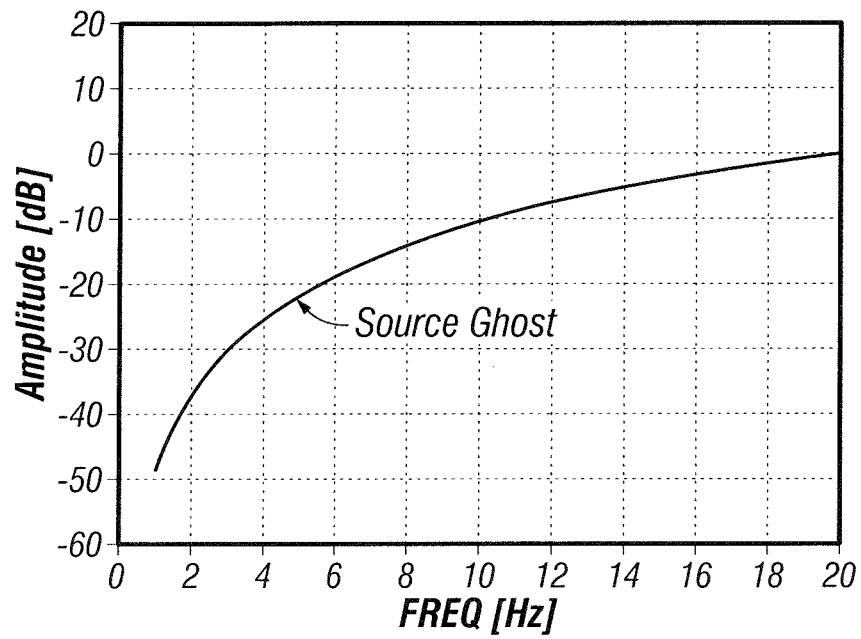
FIGS. 10 and 11 are plots of amplitude spectra versus frequency for an example marine acoustic vibrator at 10 meters and 100 meters, respectively, in accordance with example embodiments.
Figure 11:
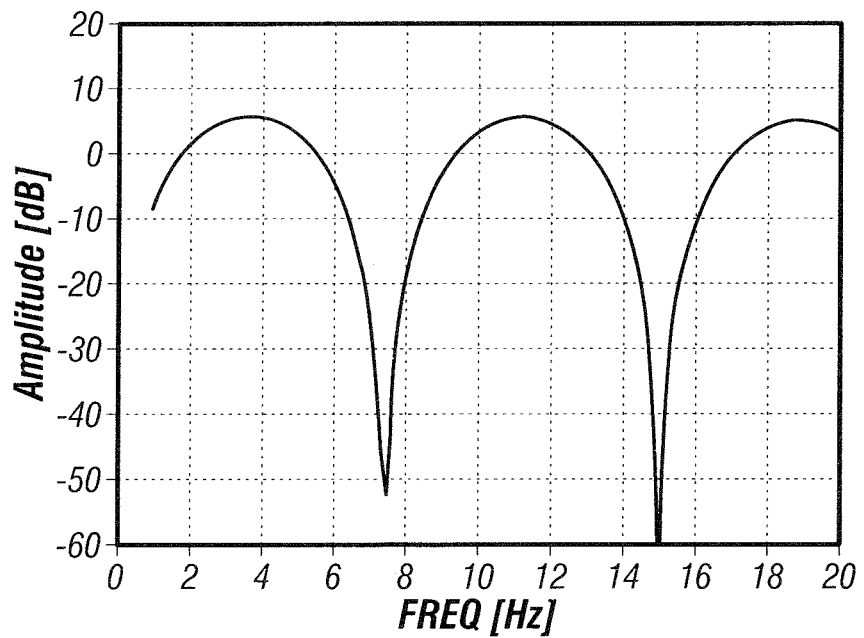

In some embodiments, the marine acoustic vibrator 100 may be towed relatively deep, for example, from about 10 meters to as deep as 100 meters or more. FIGS. 10 and 11 are plots showing the attenuation for a model of a marine acoustic vibrator 100 due to the source ghost. FIG. 10 shows the attenuation due to the source ghost at 10 meters. FIG. 11 shows the attenuation due to the source ghost at 100 meters. Accordingly, the marine acoustic vibrator 100, in particular embodiments, must be towed deeper as can be seen in FIGS. 10 and 11 to avoid undesirable attenuation of the signal by the source ghost.

Figure 12:
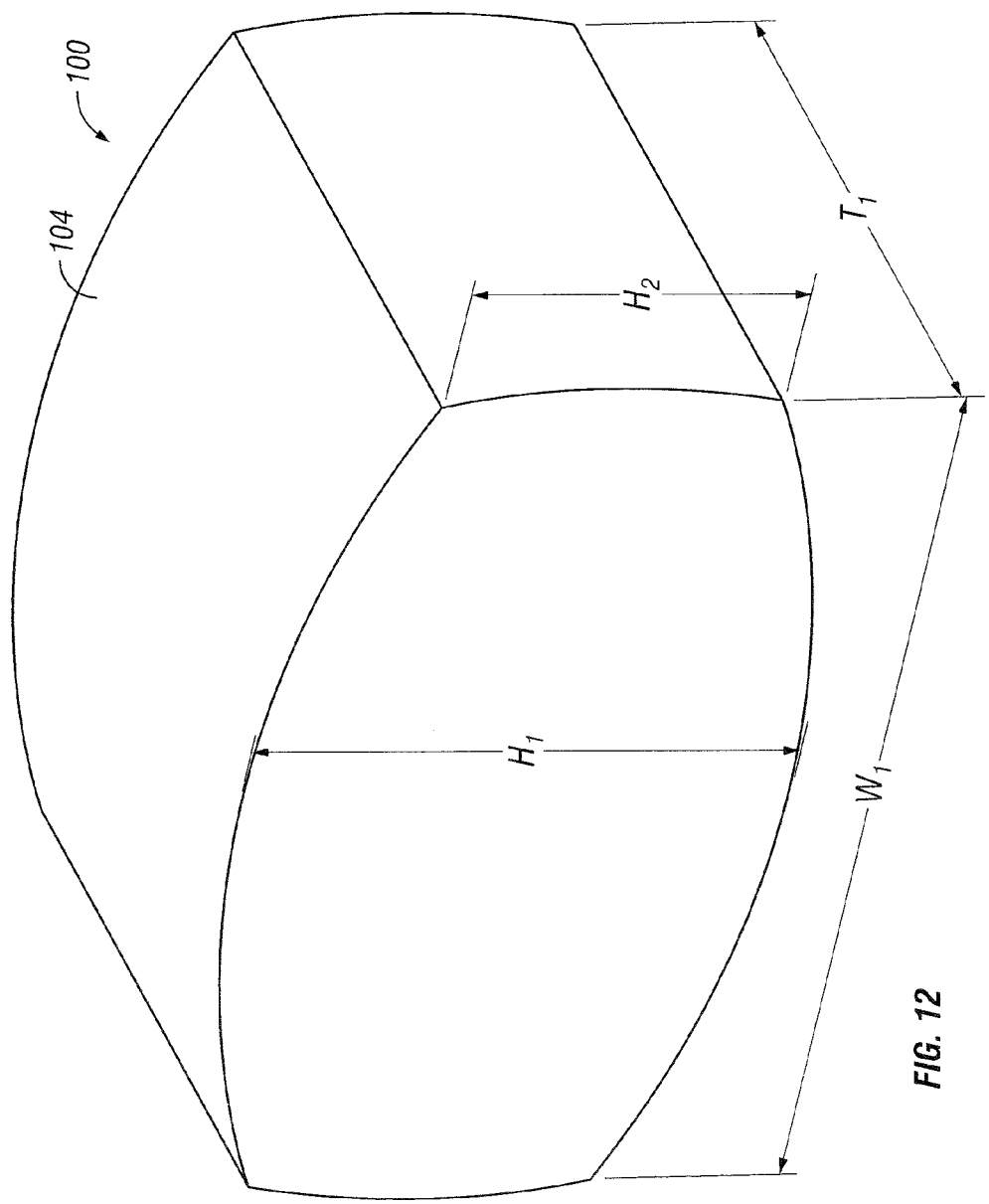
FIG. 12 illustrates an example embodiment of a marine acoustic vibrator in accordance with example embodiments.

The dimensions of the marine acoustic vibrator 100 may vary as needed for a particular application. With reference to FIG. 12, an example embodiment of a marine acoustic vibrator 100 may have a shell size as follows: 1) Shell Height $H_1$ ranging from about 0.5 meters to about 4 meters, for example, about 1.59 meters; 2) Shell End Height $H_2$ of shell end ranging from about 0.3 meters to about 1 meters; 3) Shell Width $W_1$ ranging from about 0.5 meters to about 4 meters, for example, about 1.75 meters, 4) Shell Thickness $T_1$ ranging from about 0.2 meters to about 3 meters, for example, about 2.5 meters. As illustrated, the Shell Height $H_1$ is the height of the outer shell 104 at or near its midline while Shell End Height $H_2$ is the height of the outer shell 104 at its longitudinal end. In particular embodiments, the marine acoustic vibrator 100 may have a shell size as follows: 1) Shell Height $H_1$ of 1.59 meters; 2) Shell End Height $H_2$ of 1.0 meters; 3) Shell Width $W_1$ of 1.75 meters; 4) Shell Thickness $T_1$ of 2.5 meters.

Figure 13:
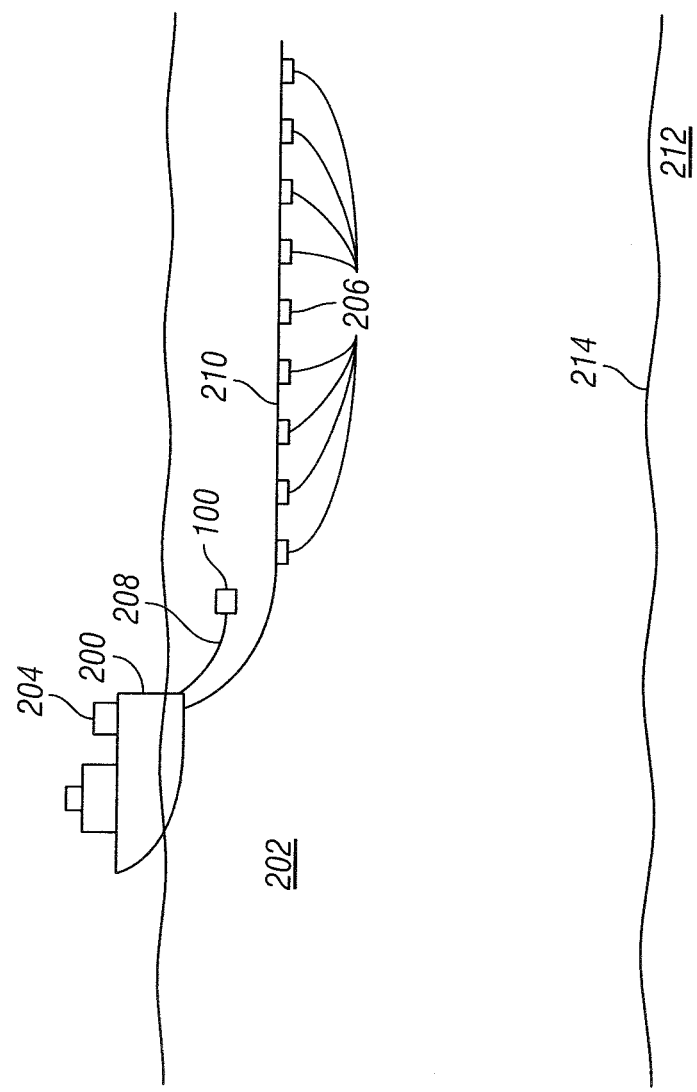
FIG. 13 is an example embodiment of a marine seismic survey system using an acoustic vibrator.

FIG. 13 illustrates an example technique for acquiring marine seismic data that can be used with embodiments of the present techniques. In the illustrated embodiment, a survey vessel 200 moves along the surface of a body of water 202, such as a lake or ocean. The survey vessel 200 may include thereon equipment, shown generally at 204 and collectively referred to herein as a "recording system." The recording system 204 may include devices (none shown separately) for detecting and making a time indexed record of signals generated by each of seismic sensors 206 (explained further below) and for actuating one or more seismic sources (as illustrated, a marine acoustic vibrator 100) at selected times. The recording system 204 may also include devices (none shown separately) for determining the geodetic position of the survey vessel 200 and the various seismic sensors 206.

As illustrated, the survey vessel 200 (or a different vessel) may tow the marine acoustic vibrator 100 in the body of water 202. A source cable 208 may couple the marine acoustic vibrator 100 to the survey vessel 200. The marine acoustic vibrator 100 may be towed in the body of water 202 at a depth ranging from 0 meters to about 300 meters, for example. While only a single marine acoustic vibrator 100 is shown in FIG. 13, it is contemplated that embodiments may include more than one seismic source (e.g. marine acoustic vibrators or air guns) towed by the survey vessel 300 or a different vessel. In some embodiments, one or more arrays of seismic sources may be used. At selected times, the marine acoustic vibrator 100 may be triggered, for example, by the recording system 204, to generate acoustic energy. The survey vessel 200 (or a different vessel) may further tow at least one sensor streamer 210 to detect the acoustic energy that originated from the marine acoustic vibrator 100 after it has interacted, for example, with rock formations 212 below the water bottom 214. As illustrated, both the marine acoustic vibrator 100 and the sensor streamer 210 may be towed above the water bottom 214. The seismic streamer 210 may contain seismic sensors 206 thereon at spaced apart locations. While not shown, some seismic surveys locate seismic sensors 206 on ocean bottom cables or nodes in addition to, or instead of, a sensor streamer 210. The seismic sensors 206 may be any type of seismic sensors known in the art, including hydrophones, geophones, particle velocity sensors, particle displacement sensors, particle acceleration sensors, or pressure gradient sensors, for example. By way of example, the seismic sensors 206 may generate response signals, such as electrical or optical signals, in response to detected acoustic energy. Signals generated by the seismic sensors 206 may be communicated to the recording system 204. In some embodiments, more than one sensor streamer 210 may be towed by the survey vessel, which may be spaced apart laterally, vertically, or both laterally and vertically. The detected energy may be used to infer certain properties of the subsurface rock, such as structure, mineral composition, and fluid content, thereby providing information useful in the recovery of hydrocarbons.

In accordance with an embodiment of the invention, a geophysical data product indicative of certain properties of the subsurface rock may be produced from the detected energy. The geophysical data product may include processed seismic geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

The foregoing figures and discussion are not intended to include all features of the present techniques to accommodate a buyer or seller, or to describe the system, nor is such figures and discussion limiting but exemplary and in the spirit of the present techniques.

What is claimed is:

1. A marine acoustic vibrator, comprising:
   an outer shell; and
   a variable gas flow restrictor disposed within the outer shell; wherein the variable gas flow restrictor comprises a first plate comprising holes, and a second plate comprising holes, the second plate being moveable to at least partially cover the holes in the first plate;
   wherein the marine acoustic vibrator has a resonance frequency selectable based at least in part on the variable gas flow restrictor.

2. The marine acoustic vibrator of claim 1, further comprising:
   a driver disposed at least partially within the outer shell and coupled thereto.

3. The marine acoustic vibrator of claim 2, wherein the driver comprises an electro dynamic driver.

4. The marine acoustic vibrator of claim 2, further comprising a fixture coupled to the outer shell, wherein the driver has a first end attached to the outer shell and a second end attached to the fixture.

5. The marine acoustic vibrator of claim 1, wherein the marine acoustic vibrator has at least two resonance frequencies of about 10 Hz or lower when submerged in water at a depth of from about 0 meters to about 300 meters.

6. The marine acoustic vibrator of claim 1, wherein the variable gas flow restrictor has an open position and a closed position, the holes in the first plate being at least partially obstructed by the second plate in the closed position, and the holes in the first plate and the holes in the second plate being aligned in the open position for maximum gas flow through the variable gas flow restrictor.

7. The marine acoustic vibrator of claim 1, wherein the variable gas restrictor is attached to a fixture in the marine acoustic vibrator, the fixture being coupled to the outer shell.

8. The marine acoustic vibrator of claim 1, further comprising a spring coupled to the outer shell, and masses attached to the spring.

9. The marine acoustic vibrator of claim 1:
   wherein the outer shell comprises a flextensional outer shell;
   wherein the marine acoustic vibrator further comprises a fixture coupled to the flextensional outer shell;
   wherein the marine acoustic vibrator further comprises a driver having a first end and a second end, wherein the first end is attached to the flextensional shaped outer shell, and the second end is attached to the fixture;
   wherein a gas spring is adapted together with a mass to generate a first resonance frequency, and wherein the value of the gas spring is changed by restriction of gas flow in the marine acoustic vibrator to thereby control the first resonance frequency at depth.

10. The marine acoustic vibrator of claim 9, wherein the marine acoustic vibrator has at least two resonance frequencies of about 10 Hz or lower when submerged in water at a depth of from about 0 meters to about 300 meters.

11. The marine acoustic vibrator of claim 9, wherein the variable gas restrictor is attached to the fixture.

12. A method comprising:
   towing an acoustic vibrator in a body of water;
   triggering the acoustic vibrator to generate acoustic energy in the body of water;
   restricting gas flow in the acoustic vibrator to control a first resonance frequency of the acoustic vibrator, wherein restricting gas flow in the acoustic vibrator comprises moving a plate to at least partially obstruct holes in another plate; and
   detecting the acoustic energy originating from the acoustic vibrator.

13. The method of claim 12, wherein the acoustic vibrator is towed at a first depth of from about 0 meters to about 300 meters.

14. The method of claim 13, further comprising:
   towing the acoustic vibrator at a second depth, wherein the gas flow is restricted in the acoustic vibrator when towed at the first depth such that the first resonance frequency of the acoustic vibrator is substantially constant when towing depth varies from the first depth to the second depth.

15. The method of claim 12, further comprising opening a variable gas flow restrictor to allow increased gas flow in the acoustic vibrator as the acoustic vibrator is lowed in the body of water.

16. The method of claim 12, further comprising increasing an shell internal gas pressure of the acoustic vibrator to equalize the shell internal gas pressure with the water pressure at depth.

17. The method of claim 12, further comprising:
   producing a geophysical data product from the detected acoustic energy indicative of certain properties of subsurface rock below the body of water.

* * * * *